United States Patent
Boul

(10) Patent No.: US 8,221,813 B2
(45) Date of Patent: Jul. 17, 2012

(54) SINGLE-SERVE PERMEABLE BEVERAGE FILTER AND METHOD OF USING SAME

(76) Inventor: John Leonard Boul, Okla. City, OK (US)

(*) Notice: Subject to any disclaimer, the term of this patent is extended or adjusted under 35 U.S.C. 154(b) by 416 days.

(21) Appl. No.: 12/386,396

(22) Filed: Apr. 17, 2009

(65) Prior Publication Data

US 2010/0047419 A1 Feb. 25, 2010

Related U.S. Application Data

(60) Provisional application No. 61/124,453, filed on Apr. 17, 2008.

(51) Int. Cl.
 *B01D 35/28* (2006.01)
 *A23F 5/26* (2006.01)
(52) U.S. Cl. ........ 426/433; 426/594; 210/455; 210/482; 210/497.1; 210/497.2; 99/306; 99/323
(58) Field of Classification Search .................. 426/433, 426/594; 210/455, 482, 497.01, 497.2, 497.1; 99/306, 323
See application file for complete search history.

(56) References Cited

U.S. PATENT DOCUMENTS

| | | | | |
|---|---|---|---|---|
| 2,716,938 A | * | 9/1955 | Smith | 99/408 |
| 4,253,959 A | * | 3/1981 | Tafara | 210/232 |
| 4,285,814 A | * | 8/1981 | Morgan, Jr. | 210/315 |
| 4,374,026 A | * | 2/1983 | Greutert | 210/493.5 |
| 4,728,425 A | * | 3/1988 | Sandvig | 210/477 |
| 4,865,737 A | * | 9/1989 | McMichael | 210/477 |
| 4,867,993 A | * | 9/1989 | Nordskog | 426/77 |
| 5,015,376 A | * | 5/1991 | Picek | 210/317 |
| 5,085,771 A | * | 2/1992 | Huang | 210/332 |
| 5,176,825 A | * | 1/1993 | Hadjis et al. | 210/259 |
| 5,176,830 A | * | 1/1993 | Wiggins | 210/477 |
| 5,462,678 A | * | 10/1995 | Rosaen | 210/798 |
| 5,605,710 A | * | 2/1997 | Pridonoff et al. | 426/86 |
| 6,662,955 B1 | * | 12/2003 | Lassota | 210/482 |
| 6,840,385 B2 | * | 1/2005 | Goldman | 210/456 |
| 7,464,637 B1 | * | 12/2008 | Lin | 99/322 |
| 7,958,816 B2 | * | 6/2011 | Lin | 99/323 |
| 2006/0169149 A1 | * | 8/2006 | Voss et al. | 99/279 |

* cited by examiner

*Primary Examiner* — Anthony Weier

(57) ABSTRACT

A disposable, single serve, fluid permeable filter configured to substantially conform to the contour of the interior surface of a permanent filter basket used in single serve type beverage brewers.

2 Claims, 2 Drawing Sheets

SINGLE-SERVE PERMEABLE BEVERAGE FILTER AND METHOD OF USING SAME

CROSS-REFERENCE TO RELATED APPLICATIONS

This application claims the benefit of provisional patent application Ser. No. 61/124,453, filed Apr. 17, 2008.

BACKGROUND OF THE INVENTION

1. Field of the Invention

This invention relates to single-serve permeable beverage filter.

2. Brief Description of Related Art

A known disposable permeable single-serve beverage filter is disclosed in U.S. Pat. Nos. 5,863,431 (Salzburg) and 3,780,871 (Hicks). This filter is comprised of a water permeable disposable filter with an open top of thermoformed or pressed permeable paper, with indicia in the case of the first, and without indicia in the case of the second. This known permeable beverage filter is widely used, although it is not constructed for use in a single-serve filter cartridge.

The current beverage containers designed for single-serve brewing are sealed. The beverage containers have preselected and pre-measured product medium. The beverage container have preselected and pre-measured product medium. The alternative use of product medium is restricted to those choices provided to consumers. Furthermore, the cost of pre-measured product medium is higher generally than when an individual is permitted to select the type, amount and cost of product medium. Likewise, the use of plastic containers for the prepackaged product medium does not lend itself to bio-degradable disposal.

In an effort to overcome the drawback of sealed, single serve beverage containers, the use of reusable filter baskets with single serve beverage brewers has been suggested. Such reusable filter baskets are positioned in a filter holder which in turn is positioned in the single serve beverage brewer. Prior to placing the filter basket in the filter housing, an individual fills the filter basket with a selected coffee. While the use of the reusable filter basket provides a much needed alternative to the prepackaged containers, problems are nevertheless encountered with use of the filter basket. The primary problem being that the filter basket is prone to clogging when fine grounds are utilized in the brewing process, thereby defeating the expediency and convenience of using a single serve brewer.

To this end, a need exists for a disposable beverage filter that overcomes the problems of prior art filters. It is to such a filter that the present invention is directed.

SUMMARY OF THE INVENTION

With the present invention, a disposable permeable beverage filter includes a single-serve filter that is configured to fit within, and designed to be coterminous with, a permanent filter basket used for brewing beverages such a coffee, tea, chocolate powder, and like product medium. The self-measured, individual preference of product medium is an alternative to pre-measured, prepackaged product medium in sealed containers. The single-serve liquid permeable filter avoids the need for a separate lid and container with pre measured product, and allows for efficient disposal of filtered beverage medium, greater choice, and lower unit cost of beverage medium. Additional features of the present invention will be described in detail with the following drawings.

DETAILED DESCRIPTION OF ILLUSTRATED EMBODIMENTS

Figure 1:
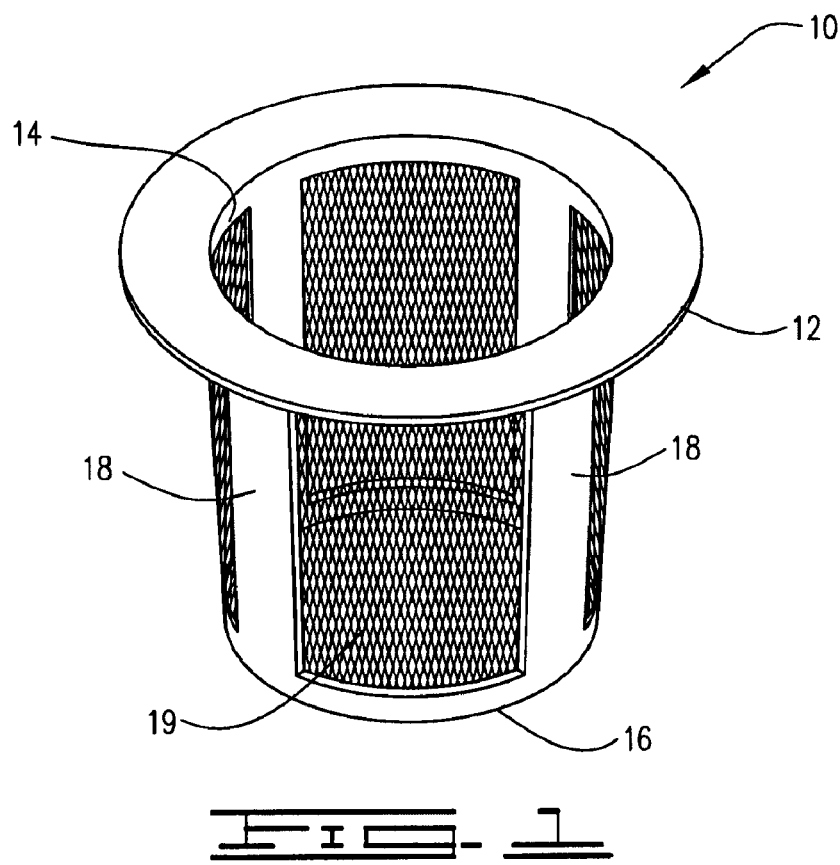
FIG. 1 is a perspective view of a prior art filter basket.

Referring now to the drawings, and more particularly to FIG. 1, shown therein is a prior art permanent, single serve wire mesh filter basket 10 configured to be positioned in a filter housing (not shown) of a single serve type beverage brewer (also not shown). The filter basket 10 has a flanged top 12 defining an open top 14, a solid bottom 16, and a plurality of side pillars 18 extending between the flanged top 12 and the solid bottom 16 to provide support and structure to the filter basket 10. A sheet of wire mesh 19 is fixed between each side pillar 14 and extends from the flanged top 12 to the solid bottom 16. As mentioned above, the wire mesh 19 of the filter basket 10 is prone to clogging from fine ground beverages, such as coffee, and is difficult to clean.

Figure 2:
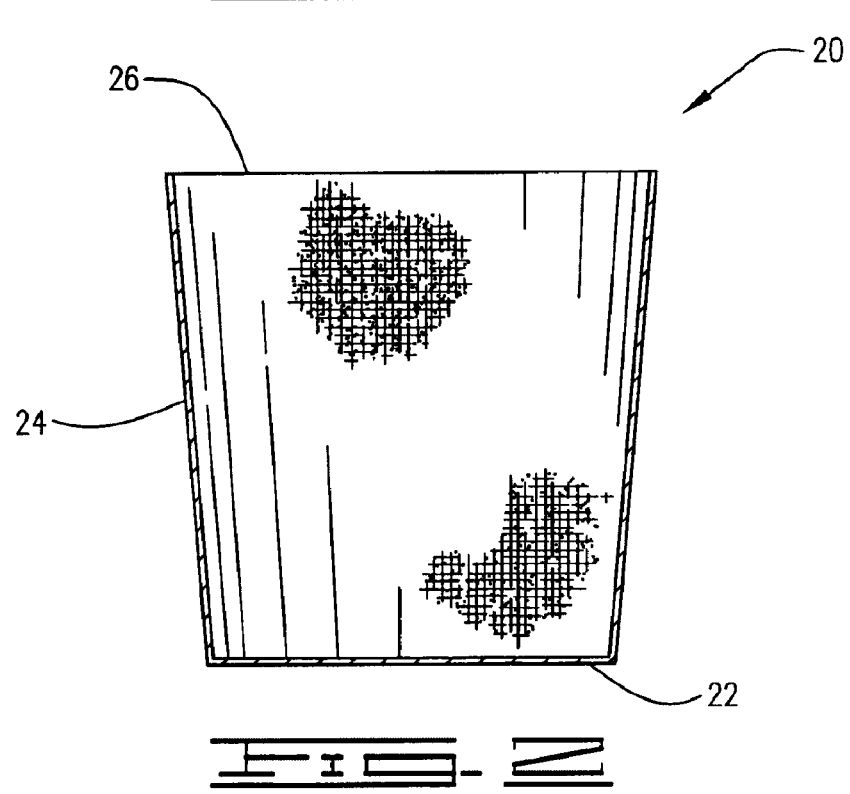
FIG. 2 is a sectional view of a fluid permeable, single serve beverage filter constructed in accordance with the present invention.

Referring now to FIG. 2, a disposable fluid permeable filter 20 constructed in accordance with the present invention is illustrated. The filter 20 is configured to substantially conform to the contour of the interior surface of the filter basket 10. The filter 20 includes a bottom 22 and a sidewall 24 defining an open top 26.

Figure 3:
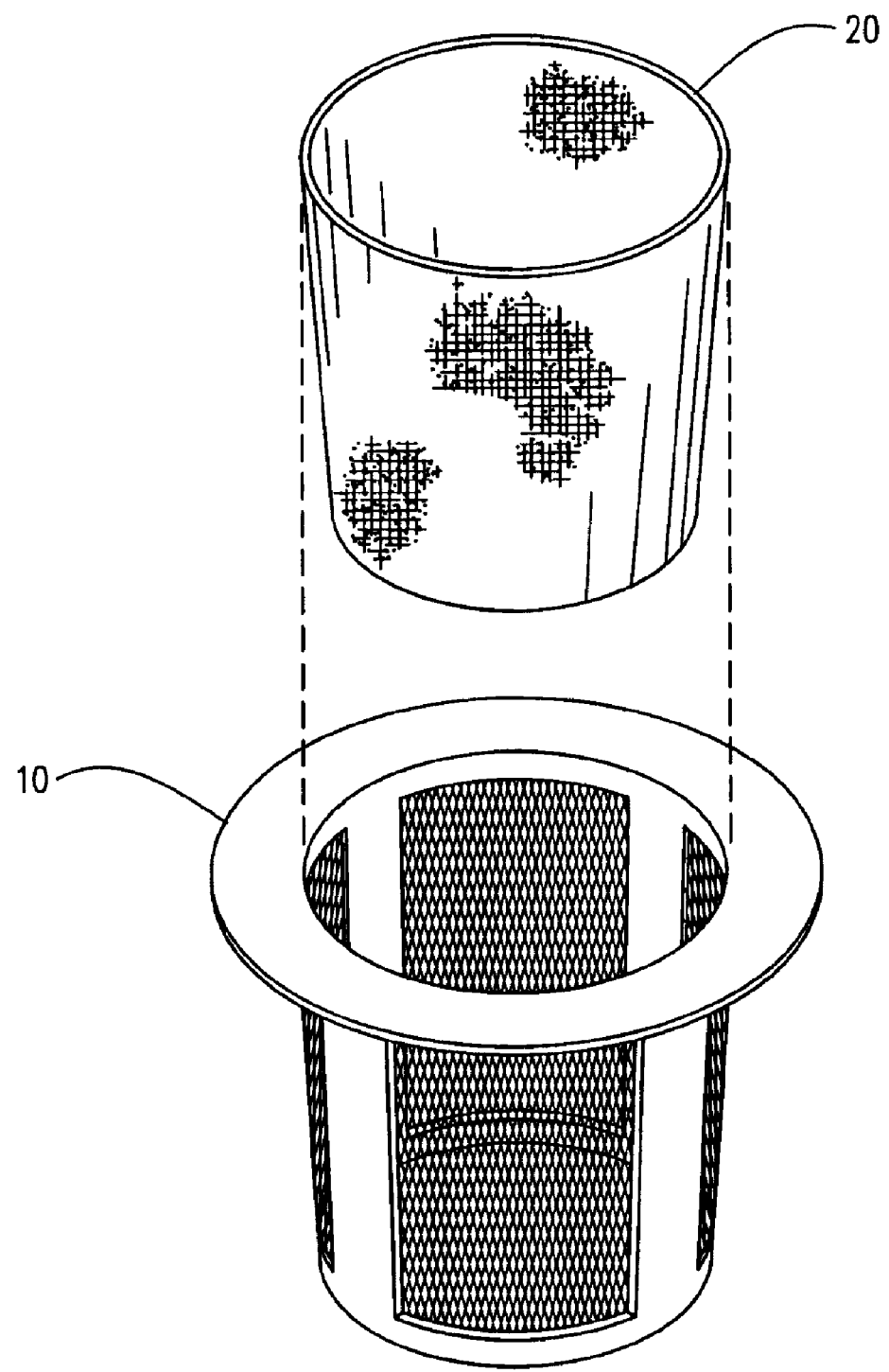
FIG. 3 is an exploded, perspective view of the filter basket of FIG. 1 and the filter of FIG. 2.

With reference to FIG. 3, in use the filter 20 is inserted into the filter basket 10. A desired beverage media, such as ground coffee, is then placed in the filter 20. The combination of the filter basket 10 and the filter 20 is then placed in the single serve brewer (not shown). Upon completion of the brewing process, the spent filter 20 may simply be removed from the filter basket 10, along with the used coffee grounds, and disposed of. It will be appreciated that use of the filter 20 eliminates the need to unclog the filter basket 10 and thus permits individuals to use coffee grinds of a desired size.

From the above description, it is clear that the present invention is well adapted to carry out the objects and to attain the advantages mentioned herein, as well as those inherent in the invention. While a presently preferred embodiment of the invention have been described for purposes of this disclosure, it will be understood that numerous changes may be made which will readily suggest themselves to those skilled in the art and which are accomplished within the spirit of the invention disclosed and as defined in the appended claims.

The invention claimed is:

1. A beverage filter, comprising:
a permanent, single serve wire mesh filter basket configured to be positioned in a filter housing of a single serve type beverage brewer, the filter basket has a flanged top defining an open top, a solid bottom, a plurality of side pillars extending between the flanged top and the solid bottom to provide support and structure to the filter basket, and a sheet of wire mesh extending between each side pillar and from the flanged top to the solid bottom; and
a disposable, liquid permeable filter having a bottom and a sidewall configured to substantially conform to the contour of the interior surface of the filter basket so as to prevent clogging of the sheet of wire mesh when a ground beverage is placed in the disposable, liquid permeable filter and a liquid is passed through the ground beverage, the disposable, liquid permeable filter, and the filter basket.

2. A method of brewing a beverage, comprising:

obtaining a permanent, single serve wire mesh filter basket configured to be positioned in a filter housing of a single serve type beverage brewer, the filter basket having a flanged top defining an open top, a solid bottom, a plurality of side pillars extending between the flanged top and the solid bottom to provide support and structure to the filter basket, and a sheet of wire mesh extending between each side pillar and from the flanged top to the solid bottom;

inserting a disposable, liquid permeable filter into the filter basket such that the filter substantially conforms to the contour of the interior surface of the filter basket;

placing ground coffee in the disposable, liquid permeable filter;

passing a liquid over the ground coffee, through the disposable, liquid permeable filter, and through the filter basket; and removing the disposable, liquid permeable filter from the filter basket.

\* \* \* \* \*